US008811254B2

(12) United States Patent
Singh et al.

(10) Patent No.: US 8,811,254 B2
(45) Date of Patent: Aug. 19, 2014

(54) DYNAMIC CONNECTION ADMISSION CONTROL TO ENFORCE SERVICE LEVEL AGREEMENTS IN MULTICAST NETWORKS

(75) Inventors: Bijendra Singh, Plano, TX (US); Chandrasekaran Ganesh, Murphy, TX (US); Vibha Chhatwal Sarin, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 795 days.

(21) Appl. No.: 12/963,175

(22) Filed: Dec. 8, 2010

(65) Prior Publication Data

US 2012/0147743 A1 Jun. 14, 2012

(51) Int. Cl.

| | |
|---|---|
| ***H04H 20/71*** | (2008.01) |
| ***H04L 12/18*** | (2006.01) |
| *H04W 4/06* | (2009.01) |
| *H04W 72/00* | (2009.01) |
| *H04W 4/08* | (2009.01) |
| *H04N 21/2385* | (2011.01) |

(52) U.S. Cl.

CPC ............... *H04L 12/185* (2013.01); *H04W 4/06* (2013.01); *H04W 72/005* (2013.01); *H04W 4/08* (2013.01); *H04N 21/2385* (2013.01)

USPC ........... 370/312; 370/230; 370/390; 370/235; 370/432

(58) Field of Classification Search

None

See application file for complete search history.

(56) References Cited

U.S. PATENT DOCUMENTS 5,452,293 A * 9/1995 Wilkinson et al. ....... 370/395.21
5,734,652 A * 3/1998 Kwok ........................ 370/395.2
6,463,474 B1 * 10/2002 Fuh et al. ...................... 709/225
6,738,816 B1 * 5/2004 Momona ....................... 709/226
6,747,970 B1 * 6/2004 Lamb et al. .................. 370/352
7,333,491 B2 * 2/2008 Chen et al. .................... 370/392
2001/0034793 A1 * 10/2001 Madruga et al. ............. 709/238
2004/0240405 A1 * 12/2004 Okazaki ........................ 370/315
2006/0045085 A1 * 3/2006 He ............................... 370/390
2006/0064729 A1 * 3/2006 Steading ......................... 725/95
2006/0176835 A1 * 8/2006 Jang et al. ..................... 370/270
2006/0239452 A1 * 10/2006 Jung et al. ....................... 380/44
2007/0147374 A1 * 6/2007 Lee et al. ...................... 370/390
2007/0217416 A1 * 9/2007 Okuda .......................... 370/390
2008/0151807 A1 * 6/2008 Meier et al. .................. 370/312
2008/0155612 A1 * 6/2008 Ikeda et al. ..................... 725/87
2008/0259857 A1 * 10/2008 Zheng .......................... 370/329
2009/0022064 A1 * 1/2009 Oron et al. .................... 370/253
2009/0070468 A1 * 3/2009 Ohta ............................ 709/226
2010/0085906 A1 * 4/2010 Yamamoto .................... 370/312
2011/0277008 A1 * 11/2011 Smith .......................... 725/116

* cited by examiner

*Primary Examiner* — Ian N Moore
*Assistant Examiner* — Dung B Huynh
(74) *Attorney, Agent, or Firm* — Baker Botts L.L.P.

(57) ABSTRACT

A method for networked communications includes determining a group identifier associated with a received request for multicast data, determining an available upstream bandwidth and an available downstream bandwidth, adding an entry for the identified group into a multicast forwarding table, allocating bandwidth from the available upstream bandwidth and available downstream bandwidth, the allocated bandwidth corresponding to bandwidth required by the requested multicast data, and forwarding the received request to an upstream network destination. The method includes, if no response is received in response to the received request within a designated timeout period, removing the entry for the identified group in the multicast forwarding table, and restoring the allocated bandwidth to the available upstream bandwidth and available downstream bandwidth.

18 Claims, 3 Drawing Sheets

| TIME | UPSTREAM A | BETWEEN A-B | DOWNSTREAM B |
|---|---|---|---|
| INITIALLY | 2 Gbps | 4 Gbps | 8 Gbps |
| t 1 | 1 Gbps | 3 Gbps | 7 Gbps |
| t 2 | 1 Gbps | 3 Gbps | 7 Gbps |
| t 3 | 0 Gbps | 2 Gbps | 6 Gbps |
| t 4 | 1 Gbps | 3 Gbps | 7 Gbps |
| t 5 | 1 Gbps | 1 Gbps | 5 Gbps |
| t 6 | 1 Gbps | 3 Gbps | 7 Gbps |

DYNAMIC CONNECTION ADMISSION CONTROL TO ENFORCE SERVICE LEVEL AGREEMENTS IN MULTICAST NETWORKS

TECHNICAL FIELD

The present invention relates generally to networked communications and, more particularly, to dynamic connection admission control to enforce dynamic service level agreements in multicast networks.

BACKGROUND

In networking systems, networking entities perform information forwarding, forwarding entry learning, and aging out of forwarding entries. Some quality-of-service mechanisms exist in switching and networking systems to design and configure packet networks to provide low latency and guaranteed delivery for data streams dependent upon continuous data service, such as video. Quality-of-service mechanisms may be designed to deal with traffic that has already entered the network such that the mechanisms cannot stop additional traffic from entering the network. Connection access control may be provided to stop additional traffic from entering the network.

SUMMARY

In one embodiment, a switch includes a processor, a memory coupled to the processor, a multicast forwarding table implemented in the memory, and one or more network interfaces. The one or more network interfaces are configured to receive a request for multicast data, and forward the received request to an upstream network destination. The processor is configured to determine a group identifier associated with the received request for multicast data, determine an available upstream bandwidth and an available downstream bandwidth, add an entry for the identified group into the multicast forwarding table, allocate bandwidth from the available upstream bandwidth and available downstream bandwidth, and cause the received request to be forwarded to the upstream network destination. The allocated bandwidth corresponds to bandwidth required by the requested multicast data. If no response is received in response to the received request within a designated timeout period, the processor is configured to remove the entry for the identified group in the multicast forwarding table, and restore the allocated bandwidth to the available upstream bandwidth and available downstream bandwidth.

In another embodiment, a method for networked communications includes determining a group identifier associated with a received request for multicast data, determining an available upstream bandwidth and an available downstream bandwidth, adding an entry for the identified group into a multicast forwarding table, allocating bandwidth from the available upstream bandwidth and available downstream bandwidth, the allocated bandwidth corresponding to bandwidth required by the requested multicast data, and forwarding the received request to an upstream network destination. The method includes, if no response is received in response to the received request within a designated timeout period, removing the entry for the identified group in the multicast forwarding table, and restoring the allocated bandwidth to the available upstream bandwidth and available downstream bandwidth.

In yet another embodiment, an article of manufacture includes a computer readable medium and computer-executable instructions carried on the computer readable medium. The instructions are readable by a processor. The instructions, when read and executed, cause the processor to determine a group identifier associated with a received request for multicast data, determine an available upstream bandwidth and an available downstream bandwidth, add an entry for the identified group into a multicast forwarding table, allocate bandwidth from the available upstream bandwidth and available downstream bandwidth, the allocated bandwidth corresponding to bandwidth required by the requested multicast data, and forward the received request to an upstream network destination. The processor is further caused to, if no response is received in response to the received request within a designated timeout period, remove the entry for the identified group in the multicast forwarding table, and restore the allocated bandwidth to the available upstream bandwidth and available downstream bandwidth.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
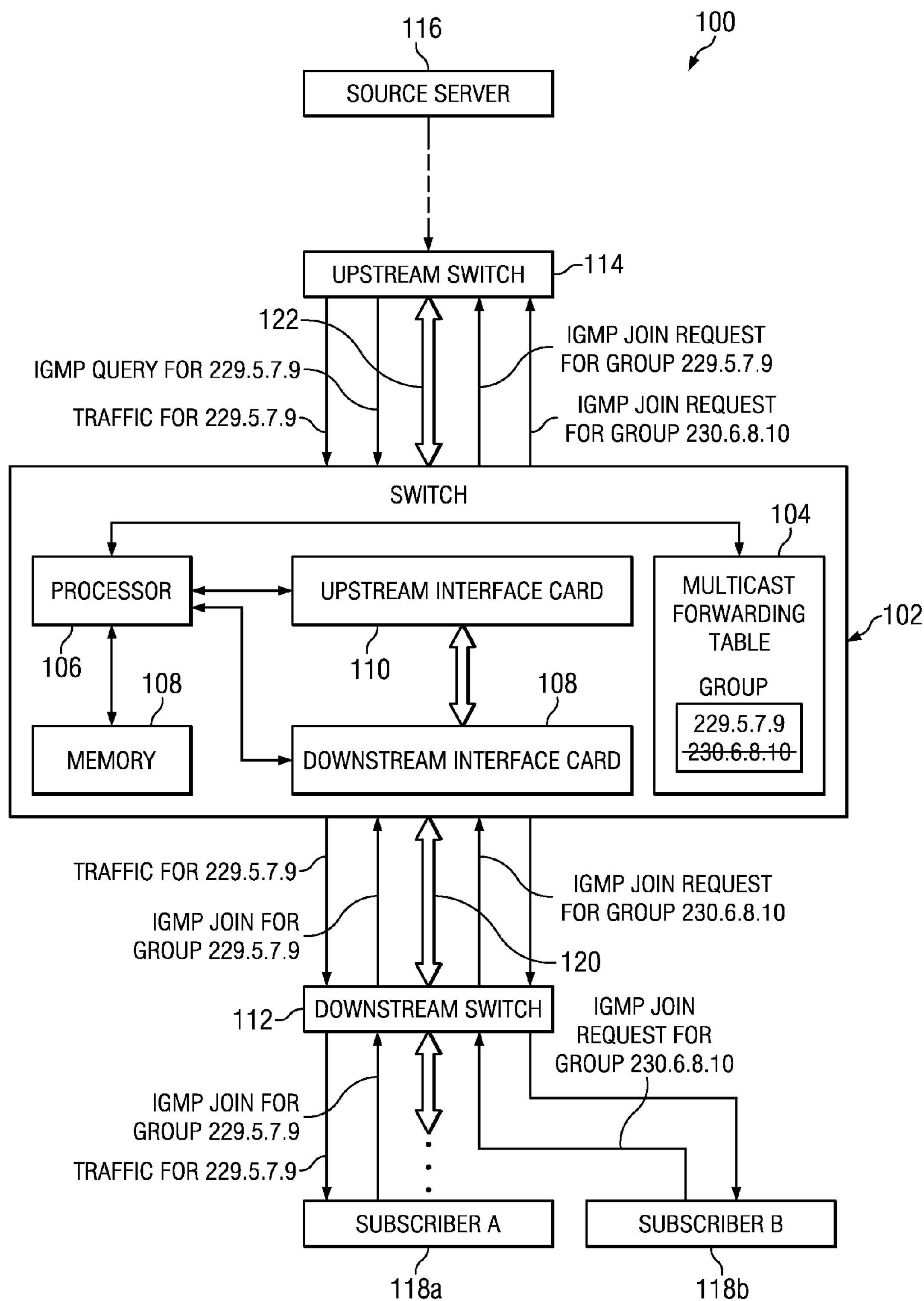
FIG. 1 is an example of a networking system based upon a switch configured to forward information between networks, computing entities, or other switching entities.

FIG. 1 is an example of a networking system 100 based upon a switch 102 configured to forward information between networks, computing entities, or other switching entities. In one embodiment, networking system 100 may be configured to provide dynamic service level agreement ("SLA") enforcement in metro multicast core networks using Internet Group Management Protocol ("IGMP") snooping and Connection Admission Control ("CAC"). Switch 102 may be configured to selectively forward information, such as packets, frames, cells, or other data, in a network, between such entities as upstream switch 114 and downstream switch 112, as well as more distant entities such as source server 116 or subscribers 118. Switch 102 may be configured to receive a request of information from source server 116 from downstream switch 112 that originating from subscribers 118. Upon receipt, switch 102 may be configured to calculate CAC bandwidth usage dynamically, reserve space for resultant traffic on upstream 122 and downstream links 120, pass the request upstream, and, if no IGMP group query response to the request is returned within the time for response, or if not multicast data traffic for requested multicast group is received, deallocate the reserved space. Otherwise, switch 102 may be configured to reply to the IGMP group query, reply to IGMP protocol messages in the standard way, or simply may send received traffic downstream. Thus, switch 102 may be configured to dynamically enforce SLA required capabilities while maximizing the usage of available bandwidth.

Switch 102 may contain an upstream interface card 110, which may be used to communicatively couple the switch to one or more network destinations. For example, in networking system 100 switch 102 may be communicatively coupled to upstream switch 114 through an interface on upstream interface card 110. Such interfaces may include a port. Likewise, switch 102 may be communicatively coupled to source server 116 through legacy metro Ethernet switch 114. Upstream interface card 110 and upstream switch 114 may be communicatively coupled through upstream link 122. Although FIG. 1 is shown as an example embodiment of networking system 100, additional embodiments may contain other suitable configurations of the upstream network communicatively coupled to switch 102, including other network entities such as switches, routers, backbones, or servers for sending information between switch 102 and an upstream network entity such as source server 116.

Switch 102 may contain a downstream interface card 108, which may be used to communicatively couple the switch to one or more network destinations. For example, in networking system 100 switch 102 may be communicatively coupled to downstream switch 112 through an interface or port on downstream interface card 108. Likewise, switch 102 may be communicatively coupled to subscriber 118 through downstream switch 112. Downstream interface card 108 and downstream switch 112 may be communicatively coupled through downstream link 120. Although FIG. 1 is shown as an example embodiment of networking system 100, additional embodiments may contain other suitable configurations of the downstream network communicatively coupled to switch 102, including other network entities such as switches, routers, backbones, or servers for sending information between switch 102 and a downstream network entity such as subscriber 118.

Upstream interface card 110 and downstream interface card 108 may be implemented in line cards. Upstream interface card 110 and downstream interface card 108 may be implemented in any suitable manner to create the embodiments described in this disclosure. In one embodiment, upstream interface card 110 and downstream interface card 108 may each be implemented in a module including electronic circuitry, processors, and/or memory for handling communications. Upstream interface card 110 and downstream interface card may each be configured to both send and receive information through upstream 122 and downstream 120 data links, respectively. Upstream interface card 110 and downstream interface card 108 may each contain ports through which multiple connections are made to the rest of the network. Upstream interface card 110 and downstream interface card 108 may be configured to exchange, for example, packets, cells, or frames of information with each other to forward information upstream or downstream. Where multiple instances of such interface cards exist, or each such interface card contains multiple ports, upstream interface card 110 and downstream interface card 108 may be configured to route such information through a switching fabric. Upstream interface card 110 and downstream interface card 108 may include network interfaces configured to forward and receive network traffic as described in this disclosure. Such network interfaces may include a port.

Each interface on card 110 and card 108 may be associated with a CAC value. The CAC value may represent the capacity of the upstream or downstream network interface according to the techniques used in CAC to estimate whether a network link can sustain an additional connection. The CAC value may be determined by processor 106, or another suitable portion of switch 102. In one embodiment, such a CAC value may be stored with the respective interface card. In another embodiment, such a CAC value may be stored in a database that contains CAC values for all interfaces of a card or of the switch 102. In yet another embodiment, such a CAC value may be stored elsewhere in the switch, such as in memory 108. CAC values may be measured, for example, in megabits-per-second (Mbps), gigabits-per-second (Gbps), or in any other suitable set of units. In one embodiment, the CAC value may represent the capacity of the network link between switch 102 and the next network entity, such as upstream switch 114 or downstream switch 112.

The designation of a particular interface card as an "upstream" interface card 110 or "downstream" interface card 108 is shown for illustrative purposes of the particular elements shown in FIG. 1, wherein a subscriber 118 will typically request multicast information from a source server 116. However, in some embodiments the interface cards of switch 102 as shown may reverse roles as necessary, wherein interface card 108 may forward and receive information with an upstream network destination and interface card 110 may forward and receive information with a downstream network destination. Likewise, the designation of particular elements of the network to which switch 102 is communicatively coupled as "upstream" or "downstream" may change depending upon the requestor and source entity. Further, in some embodiments one of interface cards 108-110 may be configured to serve as both an upstream and a downstream interface card, wherein such an interface card contains multiple ports, and one port is communicatively coupled to a downstream portion of the network and another is communicatively coupled to an upstream portion of the network. Likewise, a line card may have both upstream and downstream interfaces or ports. In such a case, data between interfaces located on the same line card may still be switched through the switching fabric.

Source server 116 may be implemented in any configuration capable of providing data in response to a request for information over a network. In one embodiment, such a request may be a multicast request, and the data provided may be a multicast data stream. Subscribers 118 may be network entities, users, or other requestors of information from source server 116.

Upstream switch 114 and downstream switch 112 may be implemented in any suitable switch, router, or other network entity for forwarding information between a network destination and switch 102. In one embodiment, upstream switch 114 and downstream switch 112 may be implemented in legacy metro Ethernet switches. In another embodiment, upstream switch 114 and downstream switch 112 may be implemented in an embodiment of switch 102 itself. Upstream switch 114 and downstream switch 112 may be configured to forward and receive information between switch 102 and network destinations such as source server 116 and subscribers 118.

Upstream data link 122 and downstream data link 120 may be implemented in any network data link suitable for transporting data between switches. Upstream data link 122 and downstream data link 120 may be measured in terms of Mbps, Gbps, or any other suitable unit of measure.

Switch 102 may include a processor 106 coupled to a memory 108. Processor 106 may comprise, for example, a microprocessor, microcontroller, digital signal processor (DSP), application specific integrated circuit (ASIC), or any other digital or analog circuitry configured to interpret and/or execute program instructions and/or process data. Processor 106 may interpret and/or execute program instructions and/or process data stored in memory 108. Memory 108 may comprise any system, device, or apparatus configured to hold and/or house one or more memory modules. Each memory module may include any system, device or apparatus configured to retain program instructions and/or data for a period of time (e.g., computer-readable media).

Processor 106 may be coupled to upstream interface card 110 and downstream interface card 108. Processor 106 may be configured to control the switching fabric that controls the exchange of outbound and inbound information between ports on the interface cards. Processor 106 may be configured to dynamically calculate the CAC values of the interfaces based on the operation of networking system 100 as described herein.

Switch 102 may include a multicast forwarding table 104. Processor 106 may be coupled to multicast forwarding table 104. Multicast forwarding table 104 may include communication and forwarding information regarding network entities connected to ports of the interface cards of switch 102. Multicast forwarding table 104 may include information regarding a multicast data group whose identity has been learned by switch 102 and may be configured to receive multicast data from a server through switch 114. Multicast forwarding table 104 may include information about which ports of switch 102 may be utilized to access a server of multicast data, or, conversely, deliver traffic to an identified multicast data stream receiver. In one embodiment, multicast forwarding table 104 may be implemented in memory 108. In another embodiment, multicast forwarding table 104 may be implemented in one or more interface cards of switch 102. Switch 102 may be configured to populate or depopulate multicast forwarding table according to the descriptions given herein, based in part upon the calculations of CAC values in conjunction with service level agreements ("SLAs"), the bandwidth available, the requests for multicast data streams, and the results of those requests. Switch 102 may be configured to determine the bandwidth requirements and/or other aspects required by an SLA governing one or more services provided by switch 102.

Switch 102 may be configured to communicate with any suitable network entity to receive and send information such as frames, packets, cells, or other data. Such network entities may include, for example, a computer, router, switch, network device, subnetwork or network. In one embodiment, switch 102 may be implemented as a metro Ethernet switch.

In operation, switch 102 may receive a request for a data from a downstream network entity. In one embodiment, such a request may include a request for a multicast data stream. In such an embodiment, the request may be implemented in an IGMP Join message. In one example, the request may be for an IPTV data stream. Such a request may arrive from downstream switch 112, and originate from a subscriber 118. For example, subscriber A may make a request for a multicast data stream with a multicast group ID of 229.5.7.9.

Switch 102 may determine the level of service required by an SLA, under which switch 102 is to provide networking services. Such a level of service may include bandwidth availability, uptime, or other indicators of quality of service. Switch 102 may determine the availability of bandwidth according to CAC, such as the CAC value, at the downstream interface on card 108 connected to downstream switch 112. Such a CAC value may be evaluated in relation to the required service levels as designated under the SLA. Such a CAC value may be determined in part by the network capacities available between switch 102 and a requesting entity. Switch 102 may determine whether downstream transmission of the requested information, such as a multicast data stream, would exceed the available bandwidth as shown by the CAC value of the downstream interface on card 108 connected to downstream switch 112. For example, if the request associated with 229.5.7.9 requires 0.5 Mbps, and the CAC value of the downstream interface link is 1.0 Mbps, then the downstream transmission may be accomplished. If the downstream transmission of the requested information would exceed the available bandwidth as shown by the CAC value of the downstream link on card 108, then no action may be taken with regards to sending a reply message to the requestor indicating a failure to support the transmission.

Similarly, switch 102 may determine the availability of bandwidth according to CAC, such as the CAC value, at the upstream interface on card 110. Such a CAC value may also be evaluated in relation to the required service levels as designated under the SLA. Such a CAC value may be determined in part by the network capacities available on the link 122 between switch 102 and the next hop, or networking device 114 towards the source of the information, such as source server 116. Switch 102 may determine whether transmission of the requested information from the upstream components, such as a multicast data stream, would exceed the available bandwidth as shown by the CAC value of the upstream interface card 110. For example, if the request associated with 229.5.7.9 requires 0.5 Mbps, and the CAC value of the upstream link 122 on interface card 108 corresponding to a valid route to the source server 116 is 4.0 Mbps, then the transmission may be accomplished. If the transmission of the requested information would exceed the available bandwidth as shown by the CAC value of the upstream link 122 interface card 108, then no action may be taken by switch 102, indicating a failure to support the transmission.

If switch 102 determines that sufficient capacity in both upstream and downstream links exists to support transmission of the requested data stream, then switch 102 may reserve bandwidth according to bandwidth requirements for the requested multicast group. Such a reservation may be implemented by lowering the CAC values available at upstream interfaces on card 110 and downstream interfaces on card 108. For example, if the multicast data stream requested by subscriber 118 requires 0.5 Mbps, then such a value may be subtracted from the CAC values of upstream interface on card 110—leaving 3.5 Mbps—and from downstream interface on card 108—leaving 0.5 Mbps.

If switch 102 determines that sufficient capacity in both upstream and downstream links exists to support transmission of the requested data stream, then switch 102 may communicate a request to upstream network entities. In one embodiment, switch 102 may forward an IGMP Join request upstream. The IGMP Join request may indicate a request for a multicast data stream to be delivered to a particular subscriber. The request may be forwarded through the upstream network interface. For example, switch 102 may send a request for a multicast data stream for the group ID 229.5.7.9, and a request for a multicast data stream for the group ID 230.6.8.10, to upstream switch 114, which may, depending upon the implementation of upstream switch 114, attempt to forward the requests upstream, possibly eventually reaching source server 116.

If switch 102 determines that sufficient capacity in both upstream and downstream links exists to support transmission of the requested data stream, then switch 102 may add a temporary entry into multicast forwarding table 104 corresponding to the information requested. In one embodiment, switch 102 may add a temporary entry with a group ID corresponding to a requested multicast data stream. For example, an entry corresponding to a group with an ID of 229.5.7.9 may be added to multicast forwarding table 104. In another example, an entry corresponding to a request to a group with an ID of 230.6.8.10 may be added to multicast forwarding table 104. In one embodiment, switch 102 may temporarily add the entry to multicast forwarding table 104. In such an embodiment, switch 102 may designate the entry added to multicast forwarding table 104 as temporary. Such a designation may be implemented, for example, in a field of the entry in multicast forwarding table 104, or in any other suitable data structure accessible by processor 106. In another embodiment, the temporary basis of an entry added to multicast forwarding table 104 may be implemented by denoting the time at which the entry was added, which may be used for comparison at a later time as described below.

Switch 102 may wait for a response from source server 116 regarding the request for information. A positive response from the upstream portions of the network may be, for example, an acceptance of the original request, an IGMP Querier-initiated request for information about the original request or requesting entities in the form of a group specific IGMP Query, or packets of information of the requested data stream itself coming from the source server 116. In one example, an IGMP Querier-initiated request for more information may include an IGMP Group Specific query message. In another example, the packets of information of the requested data stream itself may arrive at upstream interface card 110, ready to be forwarded to the requesting network entity. Occurrence of any one of these two events may be treated as a confirmation that the request forwarded by switch 102 to the upstream networking device has been accepted.

A negative response from the upstream portions of the network may, for example, be no response at all, a denial from source server 116, or a denial from an upstream network device such as upstream switch 114. In the case of no response, a request may be determined as not responded to if a timeout length of time has passed since the request was passed to the upstream portions of the network. In one embodiment, such a timeout may be sixty seconds. In another embodiment, such a timeout may set according to the maximum time expected for on IGMP Group Specific Query to be made. In such an embodiment, the timeout may be set to be sixty seconds.

If switch 102 receives a positive response from upstream regarding the requested information, then switch 102 may change the associated temporary entry in multicast forwarding table 104 into a regular entry, which is then processed using standard multicast protocol rules. The designation of an entry as regular may still be subject to other rules for entries in such forwarding tables, such as deletion after an aging-out period using standard multicast protocol rules. Switch 102 may make the associated entry regular by, for example, changing the temporary designation associated with the entry to a regular designation. In various embodiments, switch 102 may forward a received IGMP Group Specific Query or may forward packets of information of the requested data stream downstream towards the requestor. For example, if traffic for 222.5.7.9 is received at switch 102, then such traffic may be forwarded to downstream switch 112. In another example, if an IGMP Group Specific Query for 229.5.7.9 is received at switch 102, then it is forwarded to the appropriate network destination, such as subscriber A. In either such example, the entry in multicast forwarding table 104 may be made regular.

If switch 102 does not receive a positive response—for example, by receiving no response at all within a designated time period—then switch 102 may remove the associated temporary entry in multicast forwarding table. Further, switch 102 may deallocate the bandwidth previously allocated to accommodate the requested information. Switch 102 may deallocate such bandwidth by adjusting or recalculating the CAC values associated with the paths to and from the data sources and requestors. For example, if no response arrives for the request associated with group 230.6.8.10 within sixty seconds, then switch 102 may remove the entry for group 230.6.8.10 from multicast forwarding table 104, reallocate 0.5 Mbps from both the CAC values of downstream interface on card 108 and upstream interface on card 110. Downstream switch 112, if implemented in a manner similar to switch 102, may repeat the same process independently of deleting temporary entries from its own multicast forwarding tables and reclaiming the allocated bandwidth.

Consequently, switch 102 may be capable of dynamically computing the CAC value for a multicast request. Degradation of service for existing subscribers of a multicast data stream, such as subscriber A in FIG. 1, may be prevented by intelligently handling an additional request that would overburden the bandwidth capacity. If traffic arrives at switch 102 in response to the multicast request, switch 102 may be already configured to successfully forward such traffic downstream without errors due to bandwidth constraints. Switch 102 may thus be capable to dynamically reserve bandwidth, as well as prune CAC bandwidth allocated for IGMP Join requests which may be denied upstream. Thus one advantage of particular embodiments of the present disclosures is solving stale bandwidth allocation issues related to requests within one IGMP Query duration, which may be denied at any point within a long multicast request path. Switch 102 may thus be capable of working with existing multicast protocols, without changes to such protocols to accommodate the described features of switch 102. Switch 102 may thus be capable of interfacing with other protocol compliant switches, whether or not such switches are implemented in the same way as switch 102 with the features described herein. Consequently, switch 102 may be able to act in a self-contained way, based on its capacity to interpret the protocol-compliant actions and messages of other network entities in networking system 100.

Operations for an IGMP Leave message received by switch 102 may act as the reverse of an IGMP Join message. If a multicast group ID is removed in response to an IGMP Leave message, then the CAC bandwidth previously allocated for that group may be reclaimed and added to the available CAC bandwidth for both upstream and downstream links. This process may be repeated on all network entities along the path of IGMP Leave message. Thus switch 102 may be configured to enforce SLAs and ensure that no additional connection requests will be allowed if CAC bandwidth is unavailable to support the connection.

Figure 2:
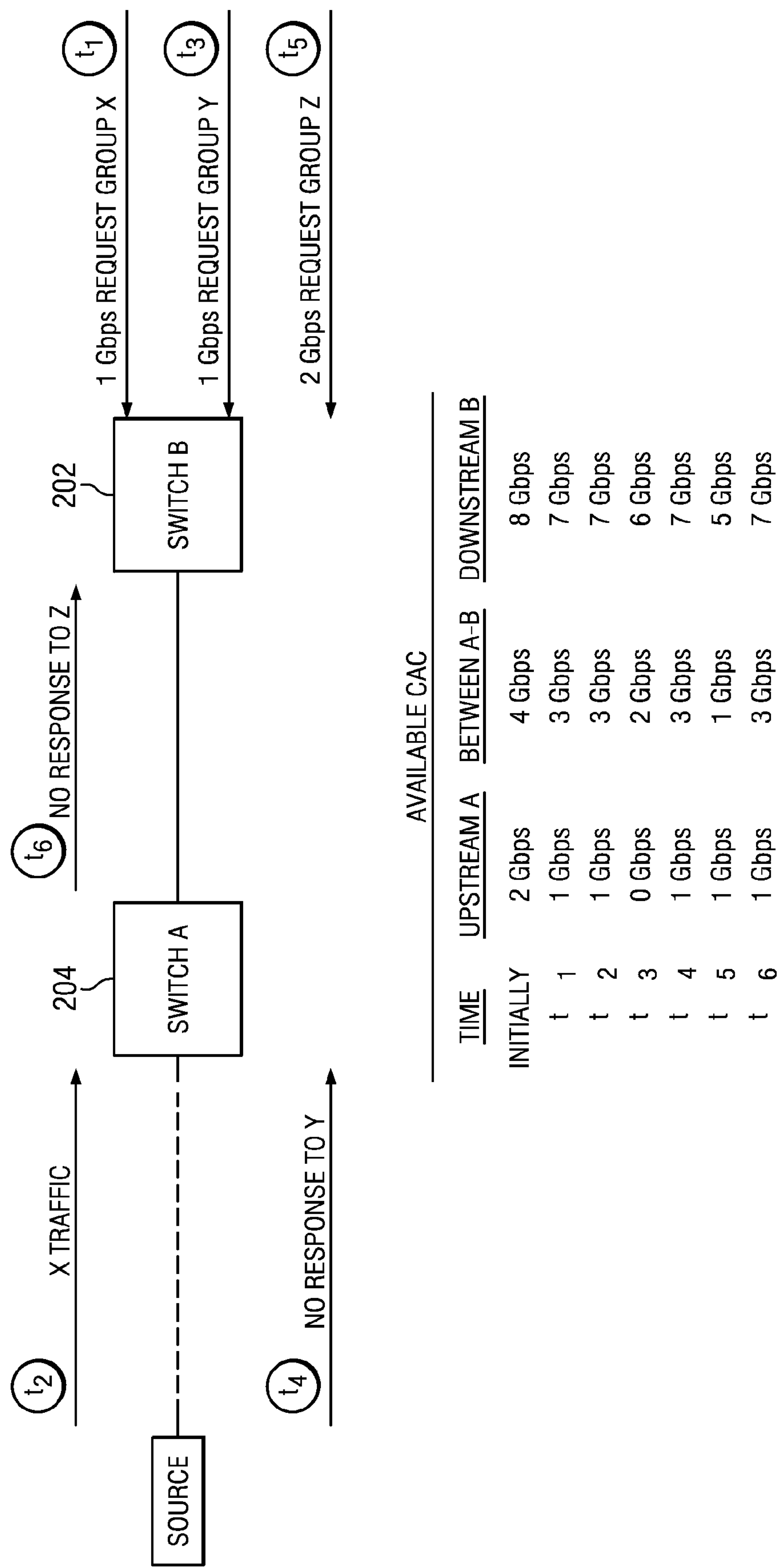
FIG. 2 is an illustration of the operation of more than one switch working together in a networking system to dynamically calculate Connection Admission Control requirements, allow or deny multicast requests, and prune allocated bandwidth.

In addition, as shown in FIG. 2, additional benefits may be derived from a network made up of multiple instances of switch 102.

FIG. 2 is an illustration of the operation of more than one switch 102 working together in a networking system 100 to dynamically calculate CAC requirements, allow or deny multicast requests, and prune allocated bandwidth. Switch A may be communicatively coupled to Switch B. Switches A and B may be implemented in embodiments of switch 102. Initially, the calculated CAC bandwidth downstream of Switch B may be eight Gbps; the bandwidth between Switch A and Switch B may be 4 Gbps; and the bandwidth upstream of Switch A may be two Gbps.

At time $t_1$, a request associated with Group X may arrive at Switch B, with a request for a multicast data stream requiring one Gbps. Switch B may determine whether sufficient CAC bandwidth exists upstream and downstream of Switch B to support the request. Since such sufficient bandwidth exists, the one Gbps requirement may be allocated and thus removed from the available CAC bandwidth downstream of Switch B and upstream between Switches A and B. The request may then be sent to Switch A, which also determines whether sufficient bandwidth exists, allocates the CAC bandwidth, and sends the request upstream. Thus, the available bandwidth upstream of Switch A may be one Gbps, between Switch A and Switch B may be three Gbps, and downstream of Switch B may be seven Gbps. Temporary entries associated with Group X may be made in the multicast forwarding tables of Switch A and Switch B.

At time $t_2$, traffic associated with group X may be sent from upstream to Switch A in response to the previous request. The traffic may be forwarded from Switch A to Switch B, and then further downstream to the requestor. If such traffic was received during the designated timeout period, then entries associated with group X may be made regular in Switch A and Switch B. The CAC bandwidth required for transmitting such traffic may be made already allocated, and thus may not require changing.

At time $t_3$, a request associated with Group Y may arrive at Switch B, with a request for a multicast data stream requiring one Gbps. Switch B may determine whether sufficient CAC bandwidth exists upstream and downstream of Switch B to support the request. Since such sufficient bandwidth exists, the one Gbps may be allocated and thus removed from the available CAC bandwidth downstream of Switch B and between Switches A and B. The request may then be sent to Switch A, which also determines whether sufficient bandwidth exists, allocates the CAC bandwidth, and sends the request upstream. Thus, the available bandwidth upstream of Switch A may be zero Gbps, between Switch A and Switch B may be two Gbps, and downstream of Switch B may be six Gbps. Temporary entries associated with Group Y may be made in the multicast forwarding tables of Switch A and Switch B. The multicast data traffic may immediately start flowing from the source to Switch A, then to Switch B, which then reaches the requestor of Group Y.

At time $t_4$, no positive response may have been received at Switch A and Switch B with regards to the request associated with Group Y. No response may be been received within the designated timeout period, or a denial or error may have been received. Switch A and Switch B may each independently determine that the request has failed. The entries associated with Group Y may be removed from the multicast forwarding tables of Switch A and Switch B within one IGMP Query interval. The CAC bandwidth allocated for Group Y may be deallocated so as to be available for use by other multicast data streams. Thus, the available bandwidth upstream of Switch A may be one Gbps, between Switch A and Switch B may be three Gbps, and downstream of Switch B may be seven Gbps.

At time $t_5$, a request associated with Group Z may arrive at Switch B, with a request for a multicast data stream requiring two Gbps. Switch B may determine whether sufficient CAC bandwidth exists upstream and downstream of Switch B to support the request. Since such sufficient bandwidth exists, the two Gbps may be allocated and thus removed from the available CAC bandwidth downstream of Switch B and between Switches A and B. An entry for Group Z may be made in the multicast forwarding table of Switch B. Thus the available bandwidth upstream of Switch A may be one Gbps, between Switch A and Switch B may be one Gbps, and downstream of Switch B may be five Gbps.

At time $t_6$, the request for Group Z may have arrived at Switch A, which may determine that insufficient CAC bandwidth is available to support the required two Gbps multicast data stream requested for Group Z. Since the request failed upstream, Switch B might not receive an IGMP Query message from upstream nor the multicast data for multicast Group Z, so Switch B may deallocate the bandwidth allocated for Group Z, and remove the temporary entry created in its multicast forwarding table. Thus, the available bandwidth upstream of Switch A may be one Gbps, Switch A and Switch B may be three Gbps, and downstream of Switch B may be seven Gbps.

Figure 3:
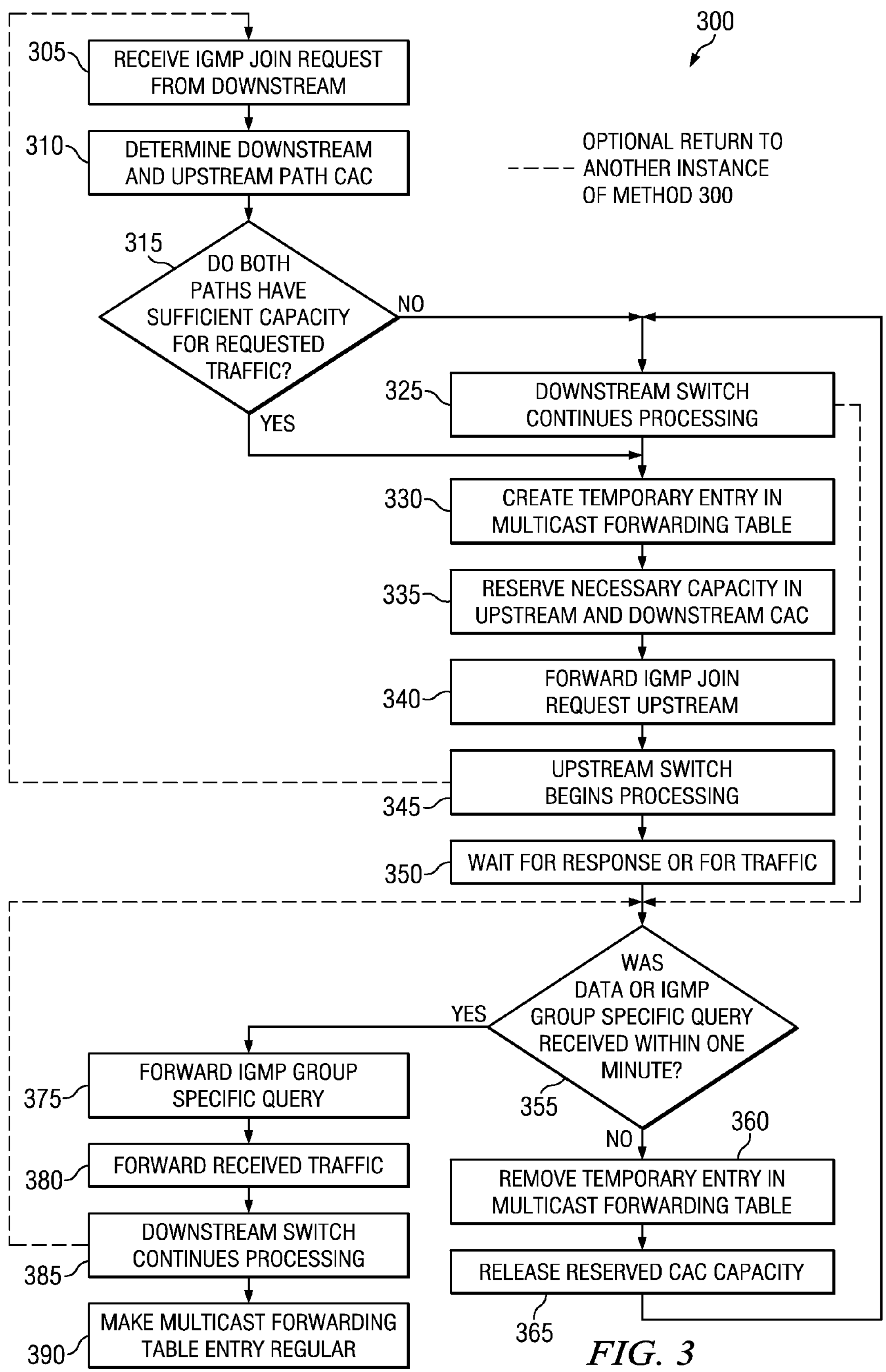
FIG. 3 is an example embodiment of a method for enforcing service level agreements in metro multicast core networks using multicast Connection Admission Control.

FIG. 3 is an example embodiment of a method 300 for providing dynamic SLA enforcement in metro multicast core networks using IGMP snooping and CAC. In step 305, a request for information such as a multicast data stream may be received from a downstream requestor. Such a request may be an IGMP Join request. In step 310, the downstream and upstream CAC bandwidth may be calculated. Such calculations may be performed, for example, using the available data links to the source and requestor of the data, the required service levels according to an SLA, and to CAC bandwidth already designated for other data streams.

In step 315, it may be determined whether sufficient CAC bandwidth is available upstream and downstream to support the requested data. If there is not sufficient CAC bandwidth, then no information, such as multicast data or an IGMP Query, may be sent downstream. In step 325, a downstream network entity that fails to receive such information within an expected duration may process the absence of such information. The downstream network entity may also be performing an embodiment of method 300. If so, the recipient may be operating step 355 of the method, wherein a response is expected regarding the request.

If sufficient CAC bandwidth is available upstream and downstream, then in step 330 a temporary entry is created in a multicast forwarding table. The entry may correspond to the group for which the data is requested. The entry may be made temporary by designating it as such in a field of the table, a separate data structure, or by noting the time upon which the request was received via a timestamp. In step 335, the bandwidth required to support the requested data may be reserved from the available upstream and downstream CAC. In step 340, the request may be forwarded upstream towards the source of the data. In step 345, the upstream recipient, such as a switch, may be begin processing the request. The recipient may also be performing an embodiment of method 300. If so, the recipient may be operating step 305, wherein a request for data is received.

In step 350, a response to the request may be waited upon. In step 355, it may be determined whether packets of the requested data or a positive response was received within a designated timeout period. In one embodiment, the timeout period may be set to one minute. In another embodiment, the positive response may be in the form of an IGMP Group Specific Query sent in response to the IGMP Join request. In yet another embodiment, instead of such data or positive response, no response or a negative response may have been received. If data or a positive response was not received, then in step 360 the temporary entry created in the multicast forwarded table may be removed, and in step 365 the allocated CAC capacity may be released. Subsequently, a downstream switch may continue processing, as in step 325.

If data or a positive response was received within the timeout period, then the method may proceed to step 375. In step 375, an IGMP Group Specific Query, or other request for more information, may be forwarded downstream. In some instances, such a request or query may be replied to, instead of forwarded, depending upon the nature of the query. In step 380, if traffic was received, it may be forwarded downstream.

In step 385, the downstream recipient of such forwarded information from steps 375 or 380 may continue processing the received information. The recipient may also be performing an embodiment of method 300. If so, the recipient may be operating step 355, wherein a response is expected regarding the request. In step 390, a multicast forwarding table entry associated with the requested information may be made regular and removed using regular IGMP protocol rules.

Although FIG. 3 discloses a particular number of steps to be taken with respect to example method 300, method 300 may be executed with more or fewer steps than those depicted in FIG. 3. In addition, although FIG. 3 discloses a certain order of steps to be taken with respect to method 300, the steps comprising method 500 may be completed in any suitable order. Method 300 may be initiated multiple times, and steps of one instance of the operation of method 300 may lead to or arise from steps of another instance of the operation of method 300.

Method 300 may be implemented using the system of FIGS. 1-2, or any other system, network, or device operable to implement method 300. In certain embodiments, method 300 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other tangible, non-transitory media; and/or any combination of the foregoing.

Although the present disclosure has been described in detail, it should be understood that various changes, substitutions, and alterations can be made hereto without departing from the spirit and the scope of the disclosure as defined by the appended claims.

What is claimed is:

1. A switch, comprising:

a processor;

a memory coupled to the processor;

a multicast forwarding table implemented in the memory;

one or more network interfaces configured to:

receive a request for multicast data;

forward the received request to an upstream network destination;

based on a determination that traffic is received in response to the request forwarded to an upstream network destination, forward the traffic to a requesting network destination from which the request originated; and the processor configured to:

determine a group identifier associated with the received request for multicast data;

determine an available upstream bandwidth and an available downstream bandwidth;

add an entry for the identified group into the multicast forwarding table, the entry designated as temporary upon addition to the multicast forwarding table;

allocate bandwidth from the available upstream bandwidth and available downstream bandwidth, the allocated bandwidth corresponding to bandwidth required by the requested multicast data;

cause the received request to be forwarded to the upstream network destination;

based on a determination that no response is received in response to the received request within a designated timeout period:

remove the entry for the identified group in the multicast forwarding table; and restore the allocated bandwidth to the available upstream bandwidth and available downstream bandwidth;

based on a determination that traffic is received in response to the request forwarded to an upstream network destination:

remove the temporary designation of the entry added to the multicast forwarding table; and maintain the allocated bandwidth.

2. The switch of claim 1, wherein the available upstream bandwidth, available downstream bandwidth, and the allocated bandwidth include Connection Admission Control bandwidth, the Connection Admission Control bandwidth determined in consideration of one or more requirements of a service level agreement.

3. The switch of claim 1, wherein the available upstream bandwidth, available downstream bandwidth, and the allocated bandwidth include Connection Admission Control bandwidth, the Connection Admission Control bandwidth determined in relationship to of one or more requirements of a service level agreement.

4. The switch of claim 1, wherein the request is an Internet Group Management Protocol Join request.

5. The switch of claim 1, wherein if an Internet Group Management Protocol ("IGMP") Group Specific Query is received in response to the request forwarded to an upstream network destination, the processor is further configured to:

remove the temporary designation of the entry added to the multicast forwarding table; and maintain the allocated bandwidth.

6. The switch of claim 1, wherein:

the processor is further configured to determine the required bandwidth of the requested multicast data;

if the requested multicast data exceeds either the available downstream bandwidth or the available upstream bandwidth:

the processor is further configured to not perform adding an entry, allocating bandwidth, or forwarding the received request.

7. A method for networked communications, comprising:

determining a group identifier associated with a received request for multicast data;

determining an available upstream bandwidth and an available downstream bandwidth;

adding an entry for the identified group into a multicast forwarding table, the entry added designated as temporary upon addition to the multicast forwarding table;

allocating bandwidth from the available upstream bandwidth and available downstream bandwidth, the allocated bandwidth corresponding to bandwidth required by the requested multicast data;

forwarding the received request to an upstream network destination;

based on a determination that no response is received in response to the received request within a designated timeout period:

removing the entry for the identified group in the multicast forwarding table; and restoring the allocated bandwidth to the available upstream bandwidth and available downstream bandwidth; and based on a determination that traffic is received in response to the request forwarded to an upstream network destination:

forwarding the traffic to a requesting network destination from which the request originated;

removing the temporary designation of the entry added to the multicast forwarding table; and maintaining the allocated bandwidth.

8. The method of claim 7, wherein the available upstream bandwidth, available downstream bandwidth, and the allocated bandwidth include Connection Admission Control bandwidth, the Connection Admission Control bandwidth determined in consideration of one or more requirements of a service level agreement.

9. The method of claim 7, wherein the available upstream bandwidth, available downstream bandwidth, and the allocated bandwidth include Connection Admission Control bandwidth, the Connection Admission Control bandwidth determined in relationship to of one or more requirements of a service level agreement.

10. The method of claim 7, wherein the request is an Internet Group Management Protocol Join request.

11. The method of claim 7, further comprising if an Internet Group Management Protocol ("IGMP") Group Specific Query is received in response to the request forwarded to an upstream network destination:

removing the temporary designation of the entry added to the multicast forwarding table; and maintaining the allocated bandwidth.

12. The method of claim 7, further comprising:

determining the required bandwidth of the requested multicast data;

if the requested multicast data exceeds either the available downstream bandwidth or the available upstream bandwidth:

not performing adding an entry, allocating bandwidth, or forwarding the received request.

13. An article of manufacture comprising:

a non-transitory computer readable medium; and computer-executable instructions carried on the non-transitory computer readable medium, the instructions readable by a processor, the instructions, when read and executed, for causing the processor to:

determine a group identifier associated with a received request for multicast data;

determine an available upstream bandwidth and an available downstream bandwidth;

add an entry for the identified group into a multicast forwarding table, the entry designated as temporary upon addition to the multicast forwarding table;

allocate bandwidth from the available upstream bandwidth and available downstream bandwidth, the allocated bandwidth corresponding to bandwidth required by the requested multicast data;

forward the received request to an upstream network destination;

based on a determination that no response is received in response to the received request within a designated timeout period:

remove the entry for the identified group in the multicast forwarding table; and restore the allocated bandwidth to the available upstream bandwidth and available downstream bandwidth;

based on a determination that traffic is received in response to the request forwarded to an upstream network destination:

forward the traffic to a requesting network destination from which the request originated;

remove the temporary designation of the entry added to the multicast forwarding table; and maintain the allocated bandwidth.

14. The article of claim 13, wherein the available upstream bandwidth, available downstream bandwidth, and the allocated bandwidth include Connection Admission Control bandwidth, the Connection Admission Control bandwidth determined in consideration of one or more requirements of a service level agreement.

15. The article of claim 13, wherein the available upstream bandwidth, available downstream bandwidth, and the allocated bandwidth include Connection Admission Control bandwidth, the Connection Admission Control bandwidth determined in relationship to of one or more requirements of a service level agreement.

16. The article of claim 13, wherein the request is an Internet Group Management Protocol Join request.

17. The article of claim 13, further comprising if an Internet Group Management Protocol ("IGMP") Group Specific Query is received in response to the request forwarded to an upstream network destination, the processor is further configured to:

remove the temporary designation of the entry added to the multicast forwarding table; and maintain the allocated bandwidth.

18. The article of claim 13, wherein the processor is further configured to:

determining the required bandwidth of the requested multicast data;

if the requested multicast data exceeds either the available downstream bandwidth or the available upstream bandwidth:

not performing adding an entry, allocating bandwidth, or forwarding the received request.

* * * * *